No. 631,467. Patented Aug. 22, 1899.
R. M. HUNTER.
SYSTEM OF ELECTRIC METERING AND APPARATUS THEREFOR.
(Application filed Nov. 15, 1898.)
(No Model.) 3 Sheets—Sheet 1.
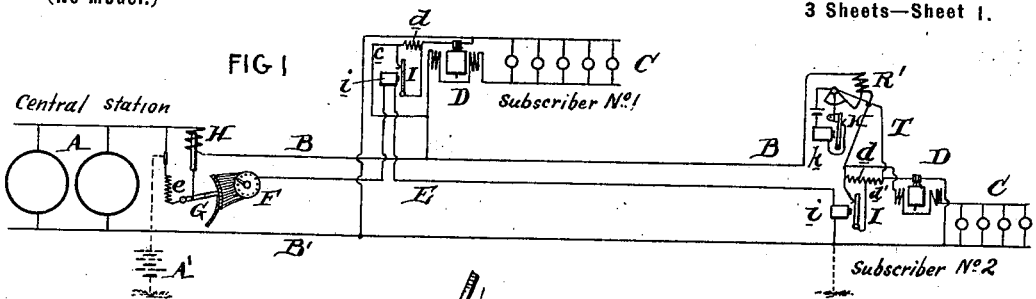
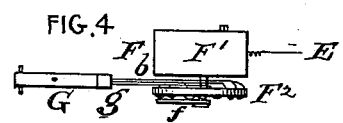
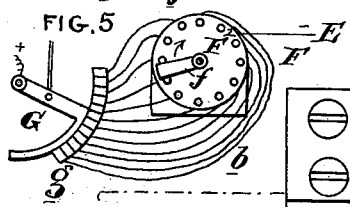
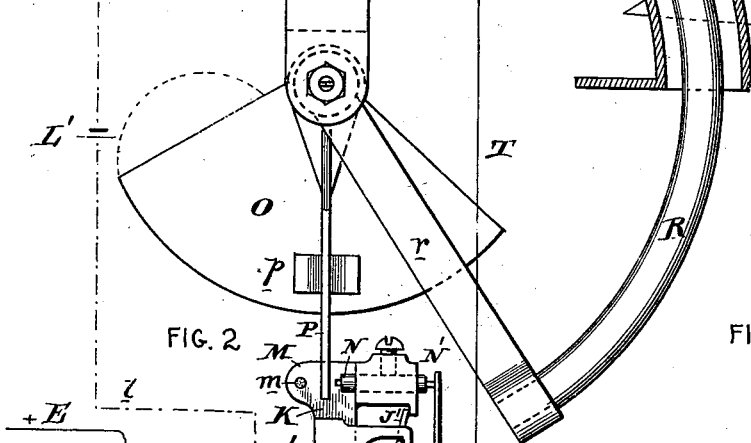
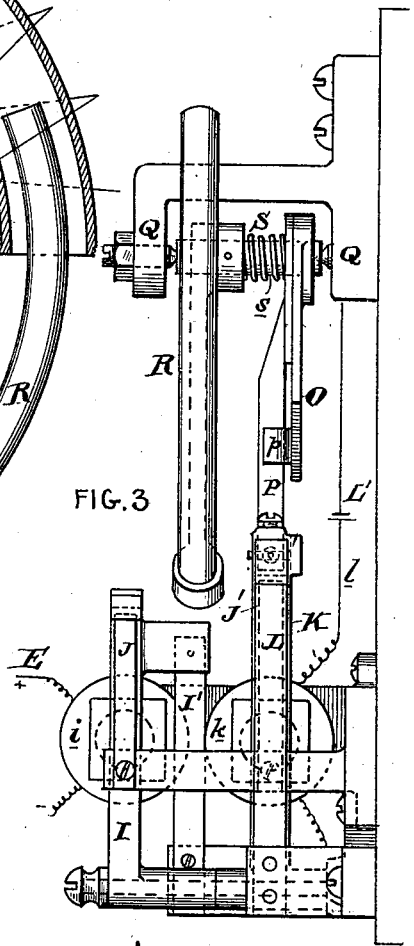
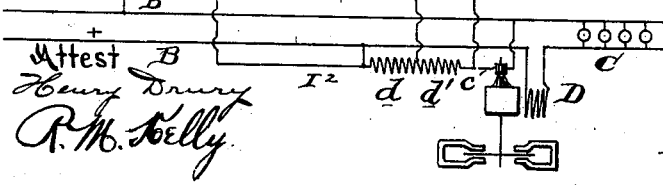

No. 631,467. Patented Aug. 22, 1899.
R. M. HUNTER.
SYSTEM OF ELECTRIC METERING AND APPARATUS THEREFOR.
(Application filed Nov. 15, 1898.)
(No Model.) 3 Sheets—Sheet 2.
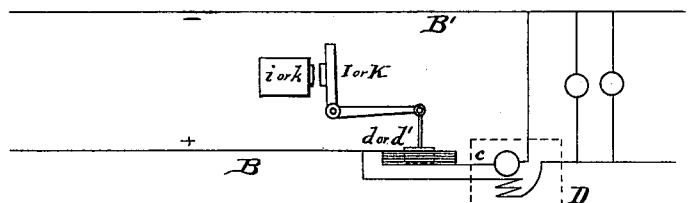
FIG. 7
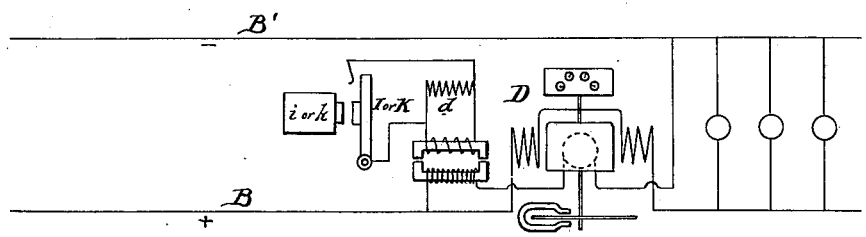
FIG. 8
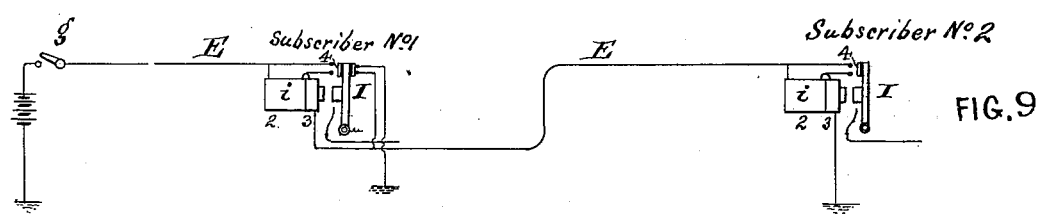
FIG. 9
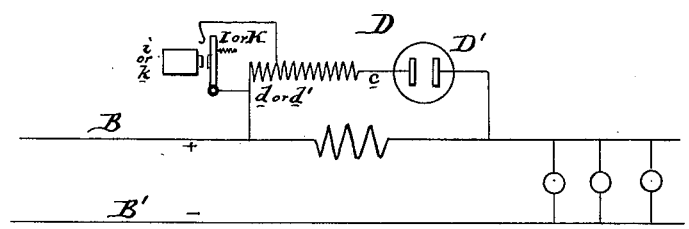
FIG. 6
Attest
Henry Drury
R. M. Kelly.
Inventor

No. 631,467. Patented Aug. 22, 1899.
R. M. HUNTER.
SYSTEM OF ELECTRIC METERING AND APPARATUS THEREFOR.
(Application filed Nov. 15, 1898.)
(No Model.) 3 Sheets—Sheet 3.
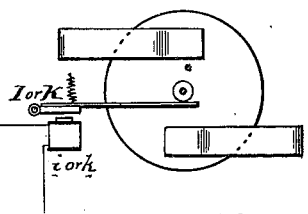
FIG. 10
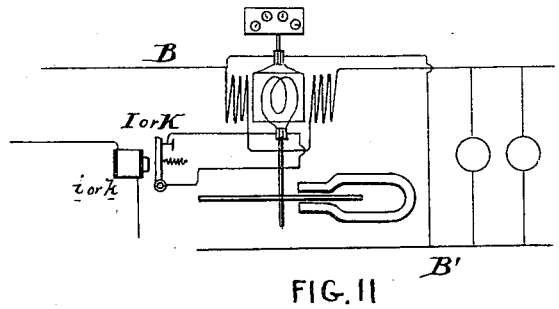
FIG. 11
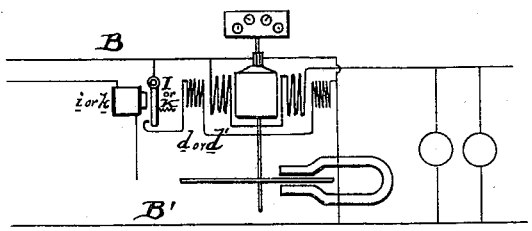
FIG. 12
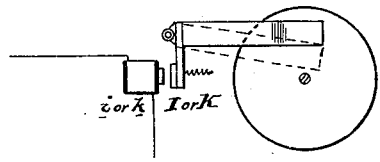
FIG. 13
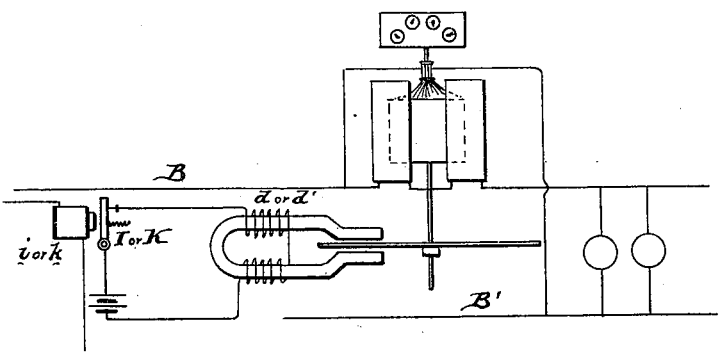
FIG. 14
Attest
R. C. Lockwood
R. M. Kelly
Inventor

UNITED STATES PATENT OFFICE.

RUDOLPH M. HUNTER, OF PHILADELPHIA, PENNSYLVANIA.

SYSTEM OF ELECTRIC METERING AND APPARATUS THEREFOR.

SPECIFICATION forming part of Letters Patent No. 631,467, dated August 22, 1899.

Application filed November 15, 1898. Serial No. 696,512. (No model.)

*To all whom it may concern:*

Be it known that I, RUDOLPH M. HUNTER, of the city and county of Philadelphia, State of Pennsylvania, have invented an Improvement in Systems of Electric Metering and Apparatus Therefor, of which the following is a specification.

My invention has reference to a system of electric metering and apparatus therefor; and it consists of certain improvements which are fully set forth in the following specification and shown in the accompanying drawings.

In central-station distribution there are constantly varying loads put upon the electrical machinery in the station due to irregularity of the consumption by needless carelessness and otherwise on the part of the consumer. This irregularity produces what are termed "peaks" in the load, which are very troublesome, since they overtax the power in operation in an objectionably sudden manner. While this irregularity is objectionable at any time irrespective of the size of the load, it is especially trying to the central-station manager and dangerous to the machinery when the peaks are excessive and occur when the station is running at approximately its full capacity. Another undesirable feature of central-station distribution lies in the fact that the load is passed through great variations during the day and night, and this is especially so between the hours of, say, five and eight p. m., when the demand for power overlaps the demand for light. This is most glaring in winter or short-day season on account of the demand for light in the latter portion of the afternoon. Central-station managers desire to eliminate the load-peaks as far as possible and also to induce a more uniform division of the daily load over the several hours thereof, since that would insure a more profitable operation of the plant. As it is practically impossible to induce consumers of current to be specially careful against great variation in their current demands or to distribute their work over the day to better advantage of the central-station plant of their own volition, it becomes necessary, to secure the desired results, that there shall be some inducement, and this is best secured by varying the charges, so as to favor the consumer of steady or uniform loads as against a consumer of irregular loads, and, further, to favor a consumer who uses current when the central station is running lightly loaded as against one who demands current at a time of day when the station is taxed to its utmost or even to a high degree.

The object of my invention is to provide a system of metering or recording a charge for current which shall automatically vary the charges, with the result of inducing the consumer to rectify the evil. For example, the meter will record a higher figure for a given current consumed when the station was heavily loaded than when lightly loaded, so that by multiplying the said figures by the price per ampere the charge is instantly arrived at and without complication. The same is true for cases where abnormal irregularities are produced in the load by the consumer, for in such cases the meter records faster at the instant of such periods and the charges are correspondingly increased. In this latter case, however, it is to be understood that the variation in the meter speed with a given consumption is only at the moment of sudden rise of consumption, but does not continue when the increased load is maintained over a long period, as under such circumstances the increased load is desired by the central-station manager. It is also evident that in any drop in the load no extra charge is desirable and none is made. If, however, this drop in the load is only temporary and a return is made to a higher load, the automatic increase in charges is made so as to make the consumer ever on the alert to enforce as steady a load as possible and consistent with the work in hand. This principle applies to all cases, whether the current is employed for power or lighting.

My object is further to provide a system and apparatus which is applicable to both continuous and alternating current distribution, and may be used without discarding the present types of meters in use, whether they be of the motor or induction type or such as employed by many of the Edison systems, in which the electrolytic action of a battery is measured and from which the current is computed. By this means I am enabled to apply my system to any existing plant without loss or change to apparatus in use, and thus avoid what would otherwise entail a heavy loss upon the power company.

While there are thus two objectionable sources of trouble to the endeavor of uniform load on the part of the station-manager, they are the same in kind, since they produce an overload, and though occurring at different times and under different conditions are met by the same character of remedy.

In carrying out my invention I combine with any ordinary meter regulating-coils which are shunted in or out of circuit to vary the speed of recording tendency of the meter and means to shunt in or out the said coils, said means operating by the increasing impulses of the current consumed, and, if desired, also operated by a variation in output or duty on the central-station plant, or either. In the most approved carrying out of my invention I cause said variation in the meter recording both for variable duty on the part of the consumer and excessive variable output on the part of the central station. The latter only induces an increased record when the load at the station becomes heavy and obviates any necessity of employing a two-rate meter. I would also point out here that in a two-rate meter or system of that kind either two meters or a compound meter with a clock and switches must be employed in lieu of the meters now in use, and that the second or higher rate begins daily at a definite hour and continues to another definite hour. This is objectionable, first, because of the necessary discarding of the regular types of meters; second, because the clockwork of the meters or switches therefor require the attention of an attendant exterior to the central station or power-house to maintain them in working order, and, third, they do not give the consumer the benefit of cases where the central station is not heavily loaded. By my improvement no outside attendant is required and consumers are only charged proportional to the variation in the output or load on the central-station plant, thereby paying an increased charge only when the load is undesirable. My aim has been to favor the consumer under proper conditions as well as the central station, and thereby secure an equitable balance between the current furnished and the charge therefor.

My invention will be better understood by reference to the accompanying drawings, in which—

Figure 1 is a diagram representing a distributing plant embodying my invention. Fig. 2 is an elevation of one portion of my apparatus at the consumer's meter. Fig. 3 is an end elevation of same. Fig. 4 is an elevation, and Fig. 5 is a plan view, of the automatic time-switch at the central station. Fig. 6 is a diagram indicating the application of my invention to an electrolytic meter. Figs. 7 and 8 are diagrams showing the application of my invention to an alternating-current-meter system. Fig. 9 is a diagram illustrating a modified construction of circuits and magnets for regulating the apparatus from the central station, and Figs. 10 to 14 are diagrams showing modified ways of varying the speed of the meter.

A is a central-station plant of any suitable construction, such as is now employed either for continuous or alternating currents.

B B' represent supply-circuits which lead over the city or district to be supplied with current.

C represents the working or load circuits at the various subscribers.

D represents an electric meter for measuring the current.

The subscriber-circuits are commonly employed in parallel and are operated with currents of constant potential in the line-circuits B B'. My improvements contemplate adapting to such circuits an electromagnetic device for causing the meter to vary its speed, so as to record faster when the central station is heavily loaded and also faster for every increase or irregularity in the load on the subscriber's circuit, the former being controlled through a circuit E, leading from the central station, and the latter being controlled by the variation in the current on the subscriber's circuit and independent of the duty of the central station. These two controlling features operate in conjunction or separately, as the case may require, and regulate the speed of meter registering the current flowing through the subscriber's circuit.

The apparatus at the subscriber's station in its most complete form is illustrated in Figs. 2 and 3, in which $i$ is an electromagnet in the circuit E, leading from the central station and operating an armature I. This armature is held against a back-stop $I^3$ by a spring J and when drawn forward makes contact with a contact-finger I', so as to permit a current to pass from the line-circuit B through a shunt-circuit $I^2$ to cut out or short-circuit a resistance $d$, whereby more current passes from the line conductor B through the armature-circuit $c$ and armature of the meter D, causing it to run faster, and consequently registers more revolutions per minute with the same field. A second electromagnet $k$ operates a second armature K against the action of a spring J', which holds it normally against the back-stop $I^3$. This armature K is provided with a pin or other abutment $m$, of insulating material, or a metallic pin, preferably suitably insulated in a lateral extension M and arranged at a short distance from a contact N, which operates to close an electric circuit through the contact-finger P when the armature is drawn forward to the electromagnet. N' is a back contact making electrical connection with the spring-finger L, so that normally the contact between L and N' is closed. The finger P is loosely sleeved upon a spindle $s$, which is pivoted at Q to a supporting-frame. This spindle is provided with a segmental guide O, against which the pivoted portion of the finger is forced with friction by the action of a spring S surrounding the spindle. Spreading-guides $p$ may also be employed on the finger P to work against the face of the segment O to steady it and insure sufficient friction to make the finger P move with the segment O when the latter is rocked. It is evident that by creating a sufficient friction between the spindle $s$ and the finger P in any suitable manner the lower portion of the segment O may be omitted as well as the guides $p$. The spindle $s$ is rocked by an arm $r$, carrying a magnetic core R, movable in a solenoid R′, arranged in the circuit through which the current is required to pass to the subscriber's load-circuits. This solenoid may be on either side of the meter and is of low resistance, so as not to offer much obstruction to the current. It is quite evident that it may be located in any suitable manner, whether in series or in shunt relation, so long as it is energized to varying degrees to correspond to various loads on the subscriber's circuit. It is quite evident that the weight of the core R may be suitably counterbalanced, as is well known in meter-work, to make it sufficiently sensitive to respond to material changes in the current flowing through the solenoid. The spring-contact finger L is in electrical connection with a local circuit $l$, which includes the electromagnet $k$ and a local battery L′ and terminates in the frame carrying the movable finger P, so that whenever the finger P is moved against the contact N by the action of the core R the electromagnet $k$ will be energized and instantly move the armature K away from the back contact N′ and break the circuit. In the forward motion of the armature K the finger P is shifted over the segment O to a new position thereon without moving the core R. The armature then moves back under the action of the spring J′, and the insulated pin $m$ may return the finger P slightly but not sufficiently to again make contact with N. The back contact N′ is again completed, but the circuit $i$ is open, since there is no contact between P and N. When this operation takes place, the further raising of the core R, due to an increase of current passing over the solenoid, causes the circuit T to be closed—namely, from conductor B through resistance $d$, then through circuit I² to the armature frame-support, thence through the armature K, contact N, finger P, and conductor T down to the armature-circuit $c$ of the meter, which action short-circuits the resistance $d'$ in the armature-circuit to the meter D, causing the meter to run faster with an impulse so long as the contact N keeps the circuit closed. This period continues for the forward motion of the armature K and is then arrested, as the contact N on return leaves the finger P. The finger P then remains in its new position. This operation will be repeated for every time the core R is drawn into the solenoid R′, but will not be repeated when the core simply moves down or outward from the solenoid. In this latter case the action simply moves the arm P against the insulated pin $m$. Slight variations in the movement of the core R will permit the finger P to swing between the contact N and the insulating-pin $m$ without short-circuiting the resistance $d$, so that the short-circuiting of said resistance is only done for material increase or upward variation in the current flowing through the subscriber's circuit. Normally the current flows through both resistances $d$ $d'$ before passing through the armature of the meter, and either the resistance $d$ is short-circuited, as first described, or the resistance $d'$, as last described, or when the variation in the load of the subscriber takes place at a time when the central station is heavily loaded then both resistances $d$ $d'$ are cut out or short-circuited and the meter runs faster still. It will thus be seen that the meter has a possibility of several ranges of speed—viz., a normally low speed for a condition when the subscriber's load is steady and the central station is not heavily loaded, a slight increased speed at periods when the central station is heavily loaded or when the subscriber's load is irregular, and a still greater speed when both of the last conditions exist, and these last two speeds register higher than what would be the normal speeds corresponding to the same current consumed by the subscribers with the meters as now existing in use. This system obviates the necessity of employing two-rate meters or of employing two or more meters for each subscriber.

The present meters in use may be employed by simply introducing my improved apparatus and circuits in connection therewith and by modifying the multiplying-constant which is commonly used in making calculations of the current consumed.

The operation of the magnet $k$ is controlled wholly by the current passing through the subscriber's circuit and is independent of the degree of load on the central station; but I have pointed out that the operation of the magnet $i$ is, on the other hand, dependent upon the load at the central station, and I will now explain in what manner it is dependent.

The circuit E is a circuit such as a telegraph-wire and is extended over the line-circuit and through the electromagnet $i$ of each of the subscribers, as shown in Fig. 1. This circuit may be grounded at the distant end or connected with the return-circuit B′. The end of the circuit E at the central station terminates in a mechanism F, which comprises a clockwork F′, operating a contact-finger $f$, and causing it to be constantly traveling over contacts on a disk F², and preferably so arranged that the contact-finger $f$ will never leave one of the contacts on the disk F² before making an electrical connection with the next one, so as not to interrupt the circuit E excepting when desired. Each of the contacts of the disk F² are connected by circuits b with a series of contacts g, the latter being arranged in corresponding order with the contacts on the disk.

G is a circuit-closing switch adapted to connect two or more of the contacts G at one time in electric circuit, and this switch G is raised or lowered by an electromagnetic device H, comprising a few turns of the line-circuit B, forming a solenoid and a core. It is evident that in place of such an electromagnetic device any other equivalent structure may be employed to produce a motion of the switch G to shift its position proportionally to the current passing over the line-circuit, and hence to the load on the central station. The movements of the switch G are therefore usually very slight, and preferably the electromagnet device does not move the switch into circuit with the contacts g until the load on the central station becomes reasonably high. After that the circuit is maintained closed and a greater number of the contacts g, as well as those on the disk F², are maintained in circuit proportionally as the load increases.

The current for energizing the line E may be supplied to the switch G from any suitable source, preferably one independent of the main generators A. If the source is a battery or other small source of energy, such as a small dynamo at A', Fig. 1, then the current may be fed to the switch G directly; but if the said source were of large capacity and supplying other devices or the main source resorted to then it is most desirable to employ a suitable resistance device e between the source and the switch G, as shown. By employing a separate source there is no danger of short-circuiting the supply circuits B B'. By employing the resistance e when the line E is supplied from the main source A short-circuiting of the line E could not produce any material damage such as might result if the resistance were not employed.

It is evident that if it were not for the movement of the contact-finger f the closing of a single contact g would maintain the electromagnet i energized and constantly keep the resistance d shunted; but this would not accomplish the result desired, since there would be no change in the operation of the meter for the variations in the line-current and load on the central station. It will be seen that by the revolving of the finger f, which takes place at a rate of, say, one revolution for each five minutes, we will have the circuit E maintained closed for a greater or less period, according as to whether more or less of the contacts g are in circuit, so that the electromagnet i may be energized for a period of one, two, or three minutes or any fraction of the five minutes during each five minutes of time while the central station is heavily loaded.

It is quite evident that the conditions here specified may be modified or changed to suit the ideas of the central-station manager, so as to make the charges conform to his or the company's ideas as to what increase in the operation of the meter speed should be necessary to secure the increased return for using the current at the period of heavy load on central station. If, however, it is only desired to make the meter operate as a two-rate meter instead of a multirate meter, it is then only necessary to employ a single contact g and omit the switch apparatus F. In this case if the central station reached a very high load it would close the circuit through line E, and this would cause all of the resistance d to be shunted and the meter to run proportionally faster, which would be equivalent to operating a second meter at the same normal rate of speed, but charging a higher rate per ampere-hour. It will furthermore be understood that if it is not desired that this part of my apparatus shall be automatic the switch G may be closed by hand when the station-manager finds that the load on the central station has reached the condition which warrants the charge of an extra rate. For example, it may be at five or six o'clock in the evening, as the case may be, and this gives an advantage over the two-rate meter, since in this latter case the switching in of the higher-rate meter is performed by a clock mechanism which operates at an hour predetermined upon and may be operated to cause an extra charge to the subscriber at a time when the central station does not happen to be overloaded or loaded to such an extent as to warrant any extra charge for current consumed by subscriber; but by my improvements, whether operated under the control of the manager of the central station or automatically, the subscriber is charged at a high rate only at times which he fairly should be charged for, and these times may begin prior to or later than the customary time usually fixed in the two-rate meter.

It will be observed that the operation of the two electromagnets and their armatures at the subscriber's station do not in any wise interfere with the proper operation of either, but they at all times coact, whether either or both are energized at one time; but it is quite evident that if it is not desired to make any special charge for the use of current when the central station is overloaded or heavily taxed then the electromagnet i with its resistance d may be omitted, or if it is not desired, on the other hand, to make special charge for irregularities in the consumers' loads then the electromagnet k may be omitted; but I prefer to employ both, since the system of metering becomes more fair and proper to the central station and at the same time is advantageous to the subscriber where he uses proper care in maintaining a steady load or where he endeavors to adapt his load to a time when the central station is not under such heavy duty.

It will be understood that while I have shown a battery L' as the source of energy for operating the electromagnet $k$ the current may be derived from the line-circuit B B' by employing a sufficient resistance either in the electromagnet itself or as an auxiliary thereto—such, for instance, by interposing an electric lamp—as will be self-apparent to any one skilled in the art.

In Fig. 1 it will be observed that in the subscriber's station No. 1 the electromagnet $i$ and armature-switch I alone is employed, whereas at subscriber's station No. 2 both electromagnets $i$ and $k$ are employed, corresponding to the full construction illustrated in Figs. 2 and 3.

In case the electrometer employed is an electrolytic cell or chemical meter, such as that largely used by the Edison system, the resistances $d$ or $d'$ are placed in the circuit $c$, containing the plates of the electrolytic cell D'. This construction is shown in Fig. 6. It will operate to enable more or less current to go through the recording electrolytic cell in accordance with the rules specified above, and the resistance $d$ or $d'$ may be incorporated with or employed as the resistance commonly used in this system of metering.

It is also evident that in some types of alternating-current meters the construction will be in all material respects the same as that shown in Figs. 2 and 3; but, if desired, in this case the resistances $d$ $d'$ may be of a few turns upon a magnetic core, so as to employ a self-induction in the meter proper as the resistance in place of an ohmic resistance. It is also evident that the same result may be secured by using a few turns of wire and with movable magnetic cores which are operated by the armatures I K, so as to insert or remove said cores in place of shunting the resistance. This construction will be understood by examining Fig. 7. The removal of the cores enables the most current to pass, and by inserting the cores when the armatures are moved the self-inductional effects are produced, which reduces the current flowing through the armature.

Another manner of operating an alternating-current meter of the inductional type is shown in Fig. 8, in which we have the closed copper armature energized by two sets of coils, one set of which is in series with the work and the other set in parallel therewith. If desired, the current flowing through the coil in parallel may be varied, and this may be accomplished in any suitable manner under the action of the armature I K, for example, as shown in Fig. 7, or the current supplied to the coil in parallel may be first passed around a coil of a transformer having a divided core, the other half of the core being provided with a secondary coil having a permanently-closed circuit through a resistance and a shunt-circuit around said resistance controlled by the electromagnets $i$ or $k$. Normally the transformer is performing work through a resistance-circuit, and consequently less current will pass through the parallel coil of the meter and the meter will run slower than would be the case when the short circuit of the transformer was closed, in which latter case greater current would pass to the parallel coil of the meter, and consequently it would run faster.

I have shown a variety of ways of applying my meter regulation in practice to indicate its adaptability to all present systems without changing or altering the meters now in use, and I wish it to be understood that I do not limit or confine myself to any special character or current. I would say, however, that in adapting my improvements to the alternating system I would prefer that the currents employed in the circuit E and circuit $i$ shall be continuous currents of small volume.

In cases where a very large number of subscribers are on the same circuit and it is necessary to insert a great many of the electromagnets $i$ in series there is a possibility of too great a resistance for convenience, even though this resistance is a fixed one and therefore not abnormally difficult to handle. I prefer to form the electromagnets $i$ with two sets of coils, one set for moving the armature and the other set for holding it when moved, so long as there is any current in the line E. This construction will be understood from Fig. 9, in which the coils 2 and 3 of the electromagnets are employed in series, but in which when the armature I is drawn forward the high-resistance coils 2 are short-circuited by the contact 4, leaving only a few low-resistance coils 3 in circuit to hold the armature when close to the core and little power is required. This reduces the resistance maintained in the circuit E, and this is further so arranged that the electromagnets operate in rapid succession, whereby at any moment there is only the resistance of one of the magnets $i$ and the few turns of the coils 3 of the previously-operated magnets in circuit, and finally all of the coils 2 are cut out and remain cut out until a fresh operation of the switch mechanism F comes into play. By this means only a very small potential is required in the line E.

While I have illustrated and particularly described the regulation of the speed of the meter by interposing and shunting resistances or by introducing a self-induction or impedance in one circuit of an electric meter, I wish it to be understood that I do not confine myself to this method, as it is self-evident to one skilled in the art that my improvements are quickly adapted to vary the speed of the meter by operating upon a mechanical brake, as in Fig. 10, or a magnetic brake, as in Fig. 11, or by increasing or decreasing the strength of the field-magnets of the meter, as in Fig. 12, or by adjusting the dampening devices commonly employed either by shifting the magnet, as in Fig. 13, or by changing its magnetism, as in Fig. 14, and by other suitable expedients which will be apparent to electricians generally. My improvements only require that some means shall be employed in connection with the electric meter proper to vary its speed, and I have shown the simplest and most inexpensive way of securing such results as an illustration of the adaptability of my invention.

While I prefer the construction herein set out, I do not limit myself to the details, and they may be employed or changed in numerous and various ways without departing from the spirit of the invention.

What I claim as new, and desire to secure by Letters Patent, is as follows:

1. The herein-described method of registering electric current in consumers' circuits, which consists, in supplying the consumption or load circuits with a current of electricity after it has energized an electric meter, and automatically causing said meter to register more rapidly per ampere of current consumed when the said current consumed is irregular in amperes than when the consumption is maintained uniform or substantially constant.

2. The herein-described method of registering electric current in consumers' circuits, which consists in supplying the consumption or load circuits with a current of electricity after it has energized an electric meter, and automatically causing more current to flow through the meter to increase its rapidity of register for a given load in amperes when said load is irregular than when regular or substantially constant.

3. The herein-described method of registering electric current in consumers' circuits, which consists in passing the current for the load-circuit to be measured through the field-coils of a motor-meter whose armature is supplied with current by a shunt-circuit across the line-circuits, and increasing the current in the armature-circuit of the meter to cause it to run faster for a given average load in amperes when said load is irregular than when regular or substantially constant.

4. The herein-described method of registering electric current in consumers' circuits, which consists in passing the current to be measured through the field-coils of a motor-meter, and automatically supplying greater current to the armature of the meter than the normal with every material increase in the load, whereby the total revolutions of the armature shall be greater when the load fluctuates than with the same average load when maintained steady or substantially constant.

5. The herein-described method of registering electric current in consumers' circuits, which consists in supplying electric current from line or supply circuits to working or consumers' circuits after having energized an electric meter, and automatically causing said meter to register more rapidly when the current supplied to the line or supply circuits at the central or generating station is high than when it is low.

6. The herein-described method of registering electric current in consumers' circuits, which consists in supplying electric current from line or supply circuits to working or consumers' circuits after having energized an electric meter, and automatically causing said meter to register proportionally more rapidly when the current supplied to the line or supply circuits at the central or generating station is high than when it is lower, whereby a higher charge may be made for current consumed when the central station is running near full load than when running with a small load.

7. The herein-described method of registering electric current in consumers' circuits, which consists in passing the current for the load-circuit to be measured through the field-coils of a motor-meter whose armature is supplied with current by a shunt-circuit across the line-circuits, and increasing the current in the armature-circuit of the meter to cause it to run faster for a high or full load on the lines and central station than when said load is much below full load.

8. The herein-described method of registering electric current in consumers' circuits, which consists in passing the current to be measured through the field-coils of a motor-meter, and automatically supplying a greater average current to the armature of the meter when the load in the mains leading from the central station or source of energy is greater than when said load is materially less.

9. The herein-described method of registering electric current in consumers' circuits, which consists in passing the current to be measured through the field-coils of a motor-meter, automatically supplying a greater average current to the armature of the meter when the load in the mains leading from the central station or source of energy is greater than when said load is materially less, and regulating said varying supply of current to the armature of the meter automatically and proportionally with the change in the load on the mains above a predetermined amount, whereby the meter shall register more rapidly when the central station or source of energy is heavily loaded than when lighter loaded.

10. In a system of electric metering, the combination of an electric meter, means independent of the meter proper for varying the current supplied to it for the purpose of making it run faster or slower while maintaining a given load, and devices under the control of the current in the line at a distant place adapted to control the means for varying the current supplied to the meter whereby the meter may be caused to operate at different speeds with a given load.

11. In a system of electric metering, the combination of an electric meter, means independent of the meter proper for varying the current supplied to it for the purpose of making it run faster or slower while maintaining a given load, devices at a distant place adapted to control the means for varying the current supplied to the meter whereby the meter may be caused to operate at different speeds with a given load, and electromagnetic devices under the control of the current in the line-circuit for automatically operating the controlling means whereby the variation in the speed of the meter with a given load is automatically controlled.

12. In a system of electric metering the combination of the supply-circuits and main source of electric energy, the subscriber's or load circuit, an electric meter for registering the current passing through the load-circuit, means for causing the electric meter to operate faster or slower independent of the load, an electromagnet to operate said means, a line-circuit electrically independent of the supply-circuits leading to a distant place and including said electromagnet, and a separate source of electric energy from the main source controlled at said distant place for supplying said line-circuit with an independent electric current whereby the meter may have its speed changed under control from a distant place.

13. In a system of electric metering, the combination of the supply-circuits, the subscriber's or load circuit, an electric meter for registering the current passing through the load-circuit, means for causing the electric meter to operate faster or slower independent of the load, an electromagnet to operate said means, a line-circuit leading to a distant place and including said electromagnet, means at said distant place for supplying said line-circuit with an electric current whereby the meter may have its speed changed under control from a distant place, an electromagnetic device controlled by the current in the supply-circuits for automatically operating the means for supplying current to the line-circuit, and a mechanically-operated circuit-controlling device for periodically closing the line-circuit and maintaining it closed for a period made variable under the action of the electromagnetic device.

14. In a system of electric metering the combination of the supply-circuits, the subscriber's or load circuit, an electric meter for registering the current passing through the load-circuit, means for causing the electric meter to operate faster or slower independent of the load, an electromagnet to operate said means, a line-circuit leading to a distant place and including said electromagnet, and means at said distant place for supplying said line-circuit with an electric current consisting of a series of contacts, a mechanically-operated switch for successively connecting the line-circuit with said contacts, and an electric switch for electrically connecting one or more of said contacts with a source of electrical energy, whereby the meter may have its speed changed under control from a distant place.

15. In a system of electric metering the combination of the supply-circuits, the subscriber's or load circuit, an electric meter for registering the current passing through the load-circuit, means for causing the electric meter to operate faster or slower independent of the load, an electromagnet to operate said means, a line-circuit leading to a distant place and including said electromagnet, and means at said distant place for supplying said line-circuit with an electric current consisting of a series of contacts, a mechanically-operated switch for successively connecting the line-circuits with said contacts, and an electric switch for electrically connecting one or more of said contacts with a source of electrical energy, and an electromagnetic device controlled by the current in the supply-circuits for automatically operating the last-mentioned electric switch, whereby the meter may have its speed changed under control from a distant place.

16. The combination of the supply-circuits, a load-circuit receiving current therefrom, an electric meter for registering the current consumed in the load-circuit, a resistance controlling the current supplied to the meter whereby the meter may be caused to run at different speeds with a given load according as to whether the resistance is in or out of the circuit, and automatic means controlled by the current in the circuits leading to the load for shunting or rendering said resistance inoperative independently of the normal operation of the meter.

17. The combination of the supply-circuits, a load-circuit receiving current therefrom, an electric meter for registering the current consumed in the load-circuit, a resistance controlling the current supplied to the meter whereby the meter may be caused to run at different speeds with a given load according as to whether the resistance is in or out of the circuit, means for shunting or rendering said resistance inoperative independently of the normal operation of the meter, and an electrically-actuated device leading from a distant place to control the operations of the means for shunting the resistance.

18. The combination of the supply-circuits, a load-circuit receiving current therefrom, an electric meter for registering the current consumed in the load-circuit, a resistance controlling the current supplied to the meter whereby the meter may be caused to run at different speeds with a given load according as to whether the resistance is in or out of the circuit, means for shunting or rendering said resistance inoperative independently of the normal operation of the meter, and an electrically-actuated device leading from a distant place to control the operations of the means for shunting the resistance consisting of an electric switch, a line-circuit independent of the supply-circuits including the electric switch leading to a distance, and a switch for connecting the line-circuit with a source of electric energy.

19. In a system of electrical distribution the combination of an electric meter for registering the current supplied to a load-circuit, and means for causing the meter to operate faster than its normal speed with a given load for a short period with every material increase in the load.

20. In a system of electrical distribution, the combination of an electric meter for registering the current supplied to a load-circuit, and means for causing the meter to operate faster than its normal speed with a given load for a short period with every material increase in the load consisting of a resistance normally in circuit with the meter, a switch to short-circuit said resistance, and an electromagnetic device controlled by the current in the load-circuit in intermittently operating said switch.

21. In a system of electrical distribution, the combination of an electric meter for registering the current supplied to a load-circuit, and means for causing the meter to operate faster than its normal speed with a given load for a short period with every material increase in the load consisting of a resistance normally in circuit with the meter, a switch to short-circuit said resistance, an electromagnetic device controlled by the current in the load-circuit and intermittently operating said switch, and a second electromagnetic device for automatically opening the switch after the same has been closed.

22. In a system of electrical distribution, the combination of an electric meter for registering the current supplied to a load-circuit, and means for causing the meter to operate faster than its normal speed with a given load for a short period with every material increase in the load consisting of a movable part to vary the speed of the meter and constituting one contact of an electric switch, a movable second contact of the electrical switch, an electromagnetic device operated by the current in the load-circuit for moving the movable contact of the electrical switch for enabling the means for increasing the speed of the meter to be effective, and electromagnetic means independent of the current in the load-circuit but controlled by the electric switch for resetting said switch automatically for the purpose of breaking the electric circuit and causing the speed of the electric meter to be reduced, whereby the electric meter may temporarily run at a high speed with every material increase of the load.

23. In a system of electrical distribution, the combination of an electric meter for registering the current supplied to a load-circuit, and means for causing the meter to operate faster than its normal speed with a given load for a short period with every material increase in the load consisting of a movable armature having a contact and an insulated abutment, a circuit-closing finger adapted to move between the contact and abutment, an electromagnetic device operated by the load-circuit, a friction connection between the electromagnetic device and the contact-finger whereby the latter may be moved with every movement of the electromagnetic device, an electric circuit controlled by the contact-finger for varying the speed of the meter, and an electromagnet for operating the armature also controlled by the contact-finger whereby the armature is actuated to reset the contact-finger and open the electric circuit immediately upon the closing of the said circuit by the finger under the operation of the electromagnetic device.

24. In a regulator for controlling the speed of an electric meter, the combination of two electromagnets $i\,k$, a circuit-closing armature I actuated by the magnet $i$, a double circuit-closing armature K operated by the magnet $k$ and having the abutment $m$ the front contact N and back contact N', a solenoid R', a movable core R adapted thereto, a contact-finger P frictionally movable with the core R and adapted to move between the abutment $m$ and contact N, an electric circuit including the electromagnet $k$ and also the contact-finger P and the terminal against which the back contact N' operates, and electric circuits respectively connected with the movable contact-finger and the last-mentioned circuit-closing armature K for varying the speed of an electric meter.

25. In an electric-meter regulator the combination of the electromagnet $k$, the armature K having the abutment $m$ and contact N, a movable circuit-closing contact-finger P movable between the abutment $m$ and contact N, a solenoid R' adapted to be inserted in electric circuit to be measured, a movable core R therefor, a frictional connection between the core R and the contact-finger, electric circuits connecting with the contact-finger, an armature or controlling device for varying the speed of the meter, and an electric circuit for energizing the electromagnet $k$ controlled by the contact-finger P and the armature K, whereby the closing of the electric circuit by the finger P under the action of the core and solenoid will produce a vibration of the armature to automatically open the circuit again by resetting the movable finger P.

26. The herein-described method of registering electric current in consumers' circuits which consists in supplying electric current from line or supply circuits to working or consumers' circuits after energizing an electric meter, varying the speed of said meter for any given current by a regulating action causing varying supply of electricity to an operative part of the meter to vary its magnetic condition, causing said regulating action to take place at frequent intervals, and automatically varying the length of said action whereby it increases with the increase of current in the supply-circuits, and vice versa.

27. In a system of electric metering the combination of the supply-circuits, the subscriber's or load circuit, an electric meter for registering the current passing through the load-circuit, means for causing the electric meter to operate faster or slower independent of the load, an electromagnet to operate said means, a line-circuit leading to a distant place and including said electromagnet, and means at said distant place for automatically and intermittently supplying said line-circuit with an electric current whereby the meter may have its speed changed under control from a distant place.

28. In a system of multiple-rate electric metering, the combination of an electric meter, electrically-controlled means independent of the meter proper for varying the current supplied to it for the purpose of making it run faster or slower with a given load, a line-circuit for supplying electric current from a distant place to the electrically-controlled means, a source of electric energy for supplying current to the line-circuit, a resistance interposed in the line-circuit near its connection with the source of electric energy, and means also at a distance from the meter for controlling the current in the line-circuit.

In testimony of which invention I hereunto set my hand.

R. M. HUNTER.

Witnesses:
J. W. KENWORTHY,
R. M. KELLY.